(12) United States Patent
Zhang

(10) Patent No.: US 9,386,491 B2
(45) Date of Patent: Jul. 5, 2016

(54) METHOD AND DEVICE FOR LOG TRANSFER

(71) Applicant: HUAWEI TECHNOLOGIES CO., LTD., Shenzhen (CN)

(72) Inventor: Kai Zhang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 219 days.

(21) Appl. No.: 14/059,803

(22) Filed: Oct. 22, 2013

(65) Prior Publication Data

US 2014/0051444 A1 Feb. 20, 2014

Related U.S. Application Data

(63) Continuation of application No. PCT/CN2012/074433, filed on Apr. 20, 2012.

(30) Foreign Application Priority Data

Apr. 22, 2011 (CN) .......................... 2011 1 0101992

(51) Int. Cl.
*H04W 36/00* (2009.01)
*H04W 24/02* (2009.01)

(52) U.S. Cl.
CPC .......... *H04W 36/0083* (2013.01); *H04W 24/02* (2013.01)

(58) Field of Classification Search
USPC ................................... 455/434, 436; 370/331
See application file for complete search history.

(56) References Cited

U.S. PATENT DOCUMENTS

| 2010/0075681 | A1 | 3/2010 | Olofsson et al. |
| 2012/0009919 | A1 | 1/2012 | Huang et al. |
| 2012/0252448 | A1* | 10/2012 | Martin et al. ............... 455/435.1 |

FOREIGN PATENT DOCUMENTS

| CN | 101370276 | 2/2009 |
| CN | 101568196 | 10/2009 |
| CN | 101686528 | 3/2010 |
| CN | 101778369 | 7/2010 |
| CN | 101778409 | 7/2010 |
| GB | 2477232 | 7/2011 |

(Continued)

OTHER PUBLICATIONS

*3rd Generation Partnership Project; Technical Specification Group Services and System Aspects; Telecommunication management; Automatic Neighbour Relation (ANR) management; Concepts and requirements (Release 10)*, 3GPP TS 32.511 V10.0.0, Mar. 2011, pp. 1-12.

(Continued)

*Primary Examiner* — Sam Bhattacharya
(74) *Attorney, Agent, or Firm* — Staas & Halsey LLP

(57) ABSTRACT

Embodiments of the present invention provide a method and a device for log transfer. The method includes: configuring control information, where the control information is used to control transfer of an automatic neighbor relation ANR log; and sending the control information to control a first radio network controller to pause or continue transfer of the ANR log to a second radio network controller, where: the first radio network controller is a radio network controller that receives the ANR log from a user equipment; and the second radio network controller is a radio network controller that controls a cell where an unconfigured neighboring cell is detected.

19 Claims, 3 Drawing Sheets

Configure control information, where the control information is used to control transfer of an ANR log — 101

Send the control information to control a first radio network controller to pause or continue transfer of the ANR log to a second radio network controller — 102

(56) References Cited

FOREIGN PATENT DOCUMENTS

| WO | WO2009057729 | 5/2009 |
|----|--------------|--------|
| WO | WO2010/105409 | 9/2010 |

OTHER PUBLICATIONS

Inter-RAT ANR reporting clarification, 3GPP TSG-RAN WG2 Meeting #73bis, R2-112170, Shanghai, China, Apr. 11-15, 2011 (5 pp.).

Extended European Search Report, dated Jul. 23, 2014, in corresponding European Application No. 12773848.2 (5 pp.).

$3^{rd}$ Generation Partnership Project; Technical Specification Group Radio Access Network; Automatic Neighborhood Relation (ANR) for UTRAN; Stage 2 (Release 10), 3GPP TS 25.484 V0.0.2, Oct. 2010, pp. 1-22.

Lur traffic consideration during Internodes Log ANR, 3GPP TSG-RAN WG3 Meeting #71, R3-110763, Taipei, Taiwan, Feb. 21-25, 2011 (12 pp.).

Office Action, dated May 22, 2014, in corresponding Chinese Application No. 201110101992.3 (11 pp.).

International Search Report and Written Opinion, dated Aug. 9, 2012, in corresponding International Application No. PCT/CN2012/074433 (10 pp.).

International Search Report mailed Aug. 9, 2012 in corresponding International Application No. PCT/CN2012/074433.

* cited by examiner

METHOD AND DEVICE FOR LOG TRANSFER

CROSS-REFERENCE TO RELATED APPLICATION

This application is a continuation of International Application No. PCT/CN2012/074433, filed on Apr. 20, 2012, which claims priority to Chinese Patent Application No. 201110101992.3, filed on Apr. 22, 2011, both of which are hereby incorporated by reference in their entireties.

TECHNICAL FIELD

Embodiments of the present invention relate to the field of wireless communications, and in particular, to a method and a device for log transfer.

BACKGROUND

For an automatic neighbour relation (Automatic Neighbour Relation, ANR) of a universal terrestrial radio access network (Universal Terrestrial Radio Access Network, UTRAN), the 3rd Generation Partnership Project (the 3rd Generation Partnership Project, 3GPP) currently uses a log to record ANR to prevent ANR measurement from affecting other higher priority services (such as a subscriber data service and paging) of a UE (User Equipment, user equipment), that is, the ANR measurement can be performed only when the UE is in an Idle (idle) state, a cell paging channel (Cell Paging Channel, Cell_PCH) state, or a UTRAN registration area paging channel (UTRAN Registration Area paging channel, URA_PCH) state, and information of detected neighbouring cells are recorded in a log (Log). A UTRAN cell where an unconfigured neighbouring cell is detected may be referred to as a base UTRAN Cell (base UTRAN cell). A radio network controller (Radio Network Controller, RNC) instructs the UE to report recorded ANR log data by using a Radio Resource Control (Radio Resource Control, RRC) signaling message. An RNC receiving the ANR log through a Uu interface (referred to as Receiving RNC hereinafter) may forward the ANR log to the RNC controlling the base UTRAN Cell through an Iur interface or a network management system such as an operation, administration, and maintenance (Operation Administration and Maintenance, OAM) device, where the RNC is referred to as a base RNC (base RNC) hereinafter.

In certain scenarios, however, the base RNC does not hope the Receiving RNC to continue sending a log to it through the Iur interface or the network management system. For example, the base UTRAN Cell has reached its maximum number of neighbouring cells or does not wish to have any new neighbouring cell relation for the purpose of network management. Alternatively, the base UTRAN Cell does not wish to add neighbouring cell relations for some newly detected neighbouring cells. For example, in some specific geographic scenarios like a high-speed railway, to ensure that an ongoing call of a fast moving UE does not drop, the base UTRAN Cell of a high-speed railway dedicated network only needs to add neighbouring cell within a planned area of a high-speed railway line and does not need to add common cells near the line as neighbouring cells.

In such situations, the continuously transferred log information is valueless to the base RNC but transport resources of the Iur interface or an interface between the RNC and the OAM device and processing resources of related RNCs and OAM device are wasted.

SUMMARY

Embodiments of the present invention provide a method and a device for log transfer, which can control the transfer of a log.

In one aspect, the present invention provides a method for log transfer, including: configuring control information, where the control information is used to control transfer of an automatic neighbour relation ANR log; and sending the control information to control a first radio network controller to pause or continue transfer of the ANR log to a second radio network controller, where: the first radio network controller is a radio network controller that receives the ANR log from a user equipment; and the second radio network controller is a radio network controller that controls a cell where an unconfigured neighbouring cell is detected.

In another aspect, the present invention provides a method for log transfer, including: receiving, by a first radio network controller, control information configured by a network management system or receiving an instruction generated by a second radio network controller according to the control information, where the control information is used to control transfer of an automatic neighbour relation ANR log; and pausing or continuing, by the first radio network controller, according to the control information or the instruction, transfer of the ANR log to the second radio network controller, where: the first radio network controller is a radio network controller that receives the ANR log from a user equipment; and the second radio network controller is a radio network controller that controls a cell where an unconfigured neighbouring cell is detected.

In another aspect, the present invention provides a method for log transfer, including: receiving, by a second radio network controller, control information configured by a network management system, where the control information is used to control transfer of an automatic neighbour relation ANR log; and instructing, by the second radio network controller, according to the control information, a first radio network controller to pause or continue transfer of the ANR log to the second radio network controller, where: the first radio network controller is a radio network controller that receives the ANR log from a user equipment; and the second radio network controller is a radio network controller that controls a cell where an unconfigured neighbouring cell is detected.

In another aspect, the present invention provides a network management system, including: a configuring unit, adapted to configure control information, where the control information is used to control transfer of an automatic neighbour relation ANR log; and a sending unit, adapted to send the control information to control a first radio network controller to pause or continue transfer of the ANR log to a second radio network controller, where: the first radio network controller is a radio network controller that receives the ANR log from a user equipment; and the second radio network controller is a radio network controller that controls a cell where an unconfigured neighbouring cell is detected.

In another aspect, the present invention provides a radio network controller that receives an automatic neighbour relation ANR log from a user equipment, including: a receiving unit, adapted to receive control information configured by a network management system or receive an instruction generated by a second radio network controller according to the control information, where the control information is used to control transfer of the automatic neighbour relation ANR log; and a controlling unit, adapted to pause or continue, according to the control information or the instruction, transfer of the ANR log to the second radio network controller, where:

the second radio network controller is a radio network controller that controls a cell where an unconfigured neighbouring cell is detected.

In another aspect, the present invention provides a radio network controller that controls a cell where an unconfigured neighbouring cell is detected, including: a receiving unit, adapted to receive control information configured by a network management system, where the control information is used to control transfer of an automatic neighbour relation ANR log; and an instructing unit, adapted to instruct, according to the control information, a first radio network controller to pause or continue transfer of the ANR log to the radio network controller, where: the first radio network controller is a radio network controller that receives the ANR log from a user equipment.

According to the embodiments of the present invention, the control information is configured, and the first radio network controller is controlled to pause or continue transfer of the ANR log to the second radio network controller, thereby implementing the control of ANR log transfer and increasing the utilization efficiency of system resources.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The technical solution of the present invention is applicable to all types of communication systems, such as Code Division Multiple Access (Code Division Multiple Access, CDMA) 2000 system, Wideband Code Division Multiple Access (Wideband Code Division Multiple Access, WCDMA), Time Division-Synchronous Code Division Multiple Access (Time Division-Synchronous Code Division Multiple Access, TD-SCDMA), and General Packet Radio Service (General Packet Radio Service, GPRS).

OAM device may be a network management system of a vendor, such as an element management system (Element Management System, EMS), or an integrated network management system of an operator, such as a network management system (Network Management System, NMS).

Currently, there is no network management solution in use to control log transfer. In scenarios where a base RNC does not hope a Receiving RNC to continue sending a log to it through an Iur interface or a network management system, such log information is valueless to the base RNC but transport resources of the Iur interface or an interface between an RNC and OAM device and processing resources of related RNCs and OAM device are wasted.

Figure 1:
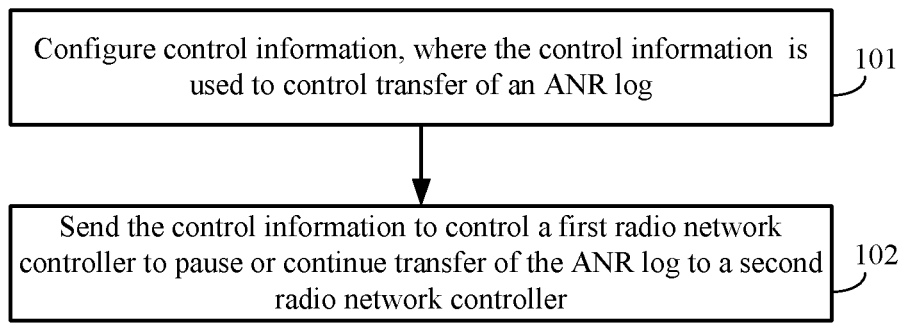
FIG. 1 is a schematic flowchart of a method for log transfer according to an embodiment of the present invention.

FIG. 1 is a schematic flowchart of a method for log transfer according to an embodiment of the present invention. The method in FIG. 1 may be executed by a network management system such as OAM device.

101. Configure control information, where the control information is used to control transfer of an automatic neighbour relation ANR log.

102. Send the control information to control a first radio network controller to pause or continue transfer of the ANR log to a second radio network controller.

The first radio network controller is a radio network controller that receives the ANR log from a user equipment; and the second radio network controller is a radio network controller that controls a cell where an unconfigured neighbouring cell is detected.

Therefore, according to the embodiment of the present invention, the control information is configured, and the first radio network controller is controlled to pause or continue transfer of the ANR log to the second radio network controller, thereby implementing the control of ANR log transfer and increasing the utilization efficiency of system resources.

In an optional embodiment, the foregoing step 102 may specifically be that a network management system sends the control information to the first radio network controller, so that the first radio network controller pauses or continues, according to the control information, transfer of the ANR log to the second radio network controller. Alternatively, the network management system sends the control information to the second radio network controller, so that the second radio network controller instructs, based on the control information, the first radio network controller to pause or continue transfer of the ANR log.

In an optional embodiment, the step 101 in the foregoing embodiments may specifically be that the network management system configures the control information by using a network management interface command message or configures the control information by modifying a configuration attribute of a network management resource model.

In an optional embodiment, the control information in the foregoing embodiments includes identity information of a cell within a control scope of the second radio network controller, or includes identity information of a cell within a control scope of the second radio network controller and identity information of the second radio network controller. The identity information of the cell within a control scope of the second radio network controller denotes all or a part of cells controlled by the second radio network controller.

Herein, the first radio network controller may be referred to as a receiving RNC (Receiving RNC) and the second radio network controller may be referred to as a base RNC (base RNC).

In the embodiment of the present invention, the control information may be sent by OAM device to the Receiving RNC directly to control log transfer operations of the Receiving RNC, or the control information is sent by OAM device to the base RNC, and then the base RNC controls log transfer operations of the Receiving RNC according to the control information.

The embodiment of the present invention controls ANR log transfer, for example, the transfer of the log through an Iur interface (between RNCs) or through a network management system (between OAM device and an RNC).

Figure 2:
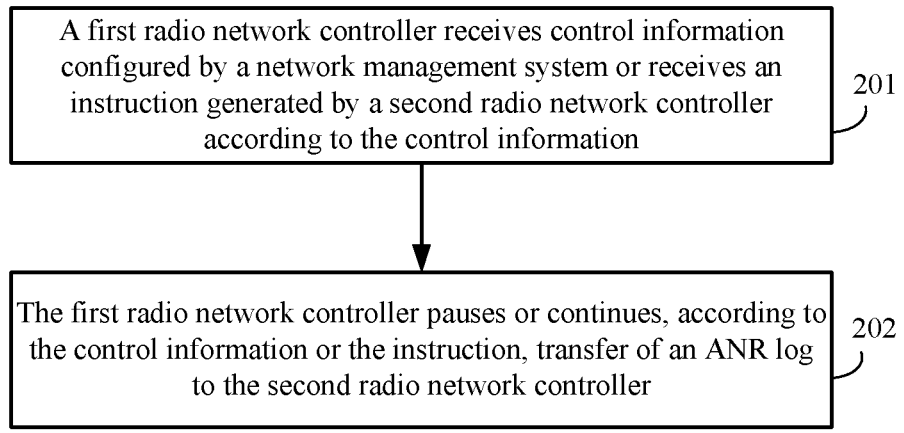
FIG. 2 is a schematic flowchart of a method for log transfer according to another embodiment of the present invention.

FIG. 2 is a schematic flowchart of a method for log transfer according to another embodiment of the present invention. The method in FIG. 2 may be executed by a radio network controller (for example, the foregoing first radio network controller, Receiving RNC).

201. A first radio network controller receives control information configured by a network management system or receives an instruction generated by a second radio network controller according to the control information, where the control information is used to control transfer of an automatic neighbour relation ANR log.

202. The first radio network controller pauses or continues, according to the control information or the instruction, transfer of the ANR log to the second radio network controller.

The first radio network controller is a radio network controller that receives the ANR log from a user equipment; and the second radio network controller is a radio network controller that controls a cell where an unconfigured neighbouring cell is detected.

In an optional embodiment, the control information in the foregoing embodiments includes identity information of a cell within a control scope of the second radio network controller, or includes identity information of a cell within a control scope of the second radio network controller and identity information of the second radio network controller. The identity information of the cell within a control scope of the second radio network controller denotes all or a part of cells controlled by the second radio network controller.

Therefore, according to the embodiments of the present invention, the control information is configured, the Receiving RNC is controlled to pause or continue transfer of a log to the base RNC, thereby implementing the control of log transfer and increasing the utilization efficiency of system resources.

In the embodiment of the present invention, the control information may be sent by OAM device to the Receiving RNC directly, or the control information is sent by OAM device to the base RNC, so that the base RNC instructs the Receiving RNC to control log transfer.

Figure 3:
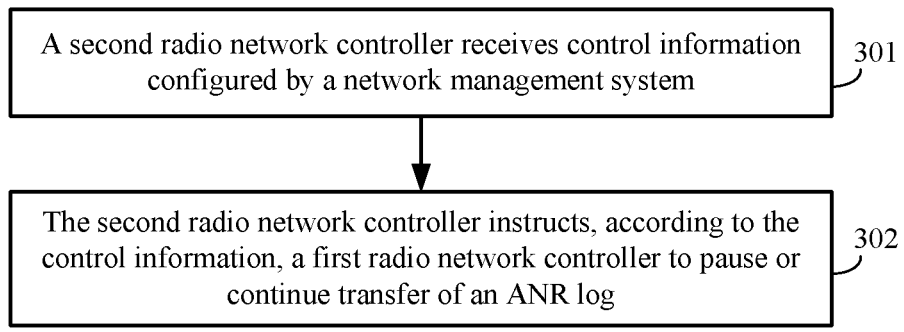
FIG. 3 is a schematic flowchart of a method for log transfer according to another embodiment of the present invention.

FIG. 3 is a schematic flowchart of a method for log transfer according to another embodiment of the present invention. The method in FIG. 3 may be executed by a radio network controller (for example, the foregoing second radio network controller, base RNC).

301. A second radio network controller receives control information configured by a network management system, where the control information is used to control transfer of an automatic neighbour relation ANR log.

302. The second radio network controller instructs, according to the control information, a first radio network controller to pause or continue transfer of the ANR log to the second radio network controller.

The first radio network controller is a radio network controller that receives the ANR log from a user equipment; and the second radio network controller is a radio network controller that controls a cell where an unconfigured neighbouring cell is detected.

In an optional embodiment, the control information in the foregoing embodiments includes identity information of a cell within a control scope of the second radio network controller, or includes identity information of a cell within a control scope of the second radio network controller and identity information of the second radio network controller. The identity information of the cell within a control scope of the second radio network controller denotes all or a part of cells controlled by the second radio network controller.

Therefore, according to the embodiments of the present invention, the control information is configured, the Receiving RNC is controlled to pause or continue transfer of a log to the base RNC, thereby implementing the control of log transfer and increasing the utilization efficiency of system resources.

The embodiments of the present invention will be described in detail through some specific examples.

Figure 4:
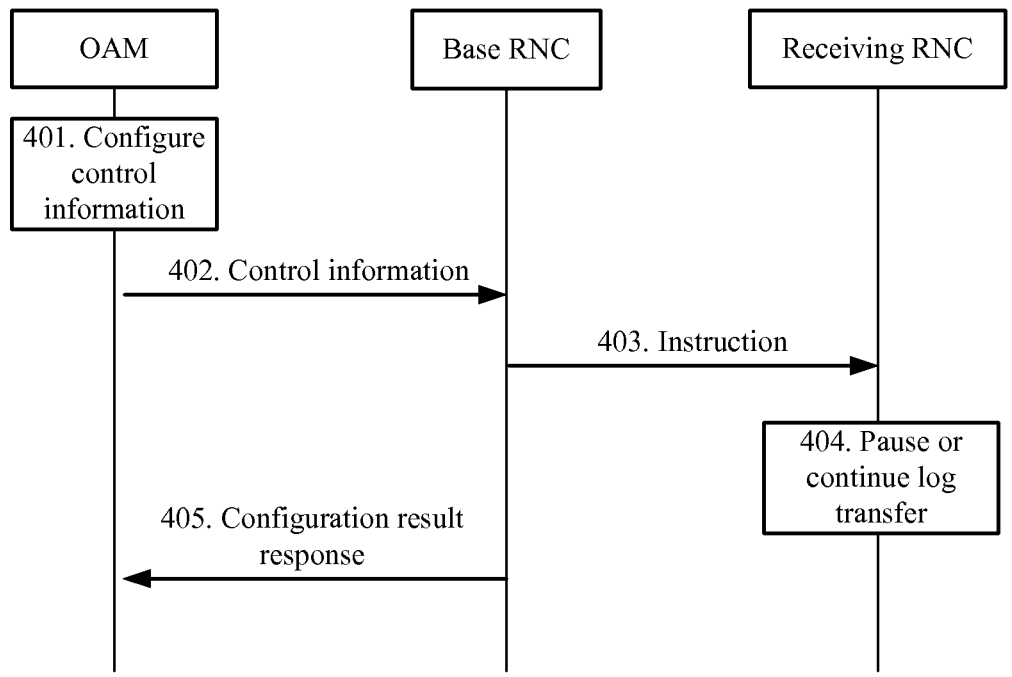
FIG. 4 is a schematic flowchart of a log transfer controlling process according to an embodiment of the present invention.

FIG. 4 is a schematic flowchart of a log transfer controlling process according to an embodiment of the present invention. In FIG. 4, OAM is a network management system, a base RNC is a base radio network controller (second radio network controller), and a Receiving RNC is a receiving radio network controller (first radio network controller). In the process in FIG. 4, control information is sent by the OAM device to the base RNC.

It should be noted that, although only one base RNC and one Receiving RNC are illustrated in FIG. 4 for the purpose of simplicity, the embodiment of the present invention is not limited thereto. In an embodiment of the present invention, for example, the log transfer from multiple Receiving RNCs to the base RNC may be controlled at the same time.

401. OAM device configures control information indicating that transfer of an ANR log needs to be paused or continued.

The control information may include a command type, that is, pause or continue. The control information may be corresponding base UTRAN Cell information.

The configuration may be performed by using a northbound or southbound network management interface command message (such as a 3GPP northbound Interface IRP command, or a network management command interface between OAM device and an RNC) or by modifying a corresponding configuration attribute of a network management resource model (such as a related attribute in a 3GPP network resource model RncFunction or a UtranGenericCell resource model).

For example, when a network management interface command message is used, a format of the command message may be {command type (Pause or Continue), base UTRAN Cell information}.

For example, when the configuration is performed by modifying a configuration attribute of a network management resource model, an attribute denoting the command type (specifically, a bool type attribute may be used to denote Pause or Continue) and a corresponding base UTRAN Cell information attribute may be added in the network resource model RncFunction.

For example, when the configuration is performed by modifying a configuration attribute of a network management resource model, an attribute denoting the command type (specifically, a bool type attribute may be used to denote Pause or Continue) may be added in the network resource model UtranGenericCell.

The control information may include identity information of a cell within a control scope of the base RNC (for example, cell identities of neighbouring cells that the base RNC does not wish to add). The identity information may be a list that at least includes an identity of one specific cell within a control scope of the base RNC. The identity information may denote all or a part of cells controlled by the base RNC. When it is needed to identify all cells within the scope of the base RNC, in addition to listing all cell identities, for the sake of simplicity, a special value may be specified to denote all cells within the scope of the base RNC, for example, cell identity value ALL, in this case, it is unnecessary to list all specific cell identities. In addition, the control information may also include identity information of the base RNC.

402. The OAM device sends the control information to a base RNC.

403. The base RNC, after receiving the control information configured by the OAM device, instructs (for example, by using an existing RAN3 Iur message process) a Receiving RNC that has an Iur interface with the base RNC to pause or continue transfer, through the Iur interface, of the ANR log to the base RNC.

404. The Receiving RNC pauses or continues transfer, according to the instruction of the base RNC, of the ANR log to the base RNC.

405. The base RNC, after receiving the control information (for example, the foregoing network management interface command) from the OAM device, sends a configuration result (success or failure) response message to the OAM device. Step 405 is optional. Alternatively, the OAM device may obtain a configuration result according to a related notification of modification to a configuration attribute of a network management resource model.

Figure 5:
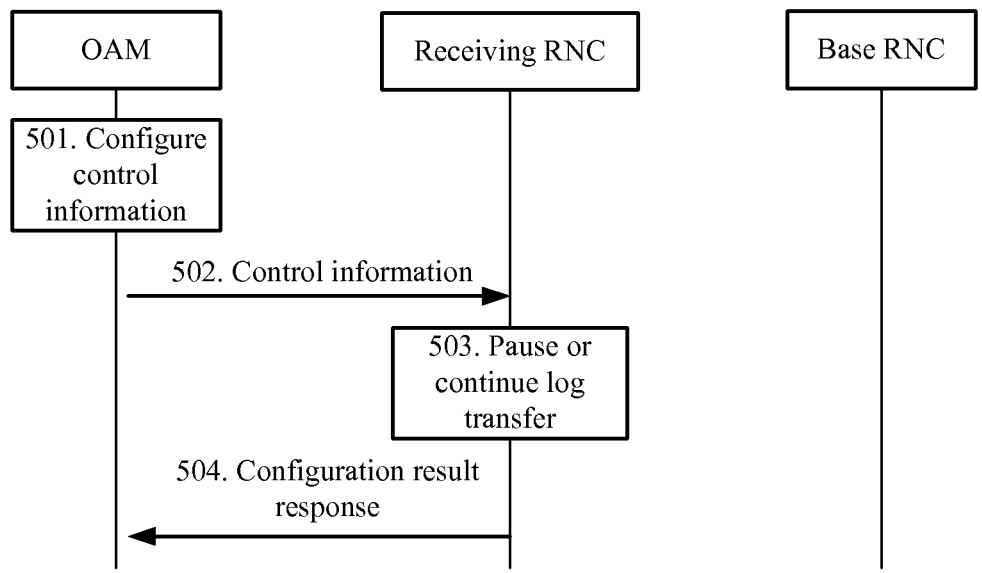
FIG. 5 is a schematic flowchart of a log transfer controlling process according to another embodiment of the present invention.

FIG. 5 is a schematic flowchart of a log transfer controlling process according to another embodiment of the present invention. In FIG. 5, OAM is a network management system, a base RNC is a base radio network controller (second radio network controller), and a Receiving RNC is a receiving radio network controller (first radio network controller). In the process in FIG. 5, control information is sent by the OAM device to the Receiving RNC directly.

Step 501 is similar to step 401 in FIG. 4, where the OAM device configures control information indicating that transfer of an ANR log needs to be paused or continued. The difference is that the control information configured in step 501 should include identity information of the base RNC and identity information of a cell within a control scope of the base RNC (for example, cell identities of neighbouring cells that the base RNC does not wish to add).

502. The OAM device sends the control information to one or more RNCs (that is, Receiving RNCs) neighbouring to the base RNC.

503. The Receiving RNC, after receiving the control information configured by the OAM device, pauses or continues transfer, through an Iur interface or an OAM interface, of the ANR log to the base RNC according to the control information.

504. The Receiving RNC, after receiving the control information (for example, the foregoing network management interface command) from the OAM device, sends a configuration result (success or failure) response message to the OAM device. Step 504 is optional. Alternatively, the OAM device may obtain a configuration result according to a related notification of modification to a configuration attribute of a network management resource model.

Therefore, the embodiment of the present invention provides a simple and effective network management method for controlling ANR log transfer, which enables the Receiving RNC to pause or continue transfer, according to the configuration of the OAM device, of the ANR log to the base RNC through the Iur interface or OAM device.

Through this method, the OAM device can restrict the ANR log transfer of the Receiving RNC as required, which effectively reduces unnecessary transfer loads over the Iur interface (between the Receiving RNC and the base RNC) or the interface between the RNC and the OAM device.

Figure 6:
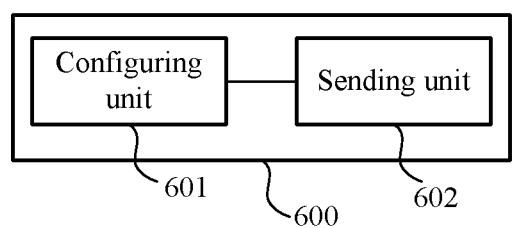
FIG. 6 is a schematic block diagram of a network management system according to an embodiment of the present invention.

FIG. 6 is a schematic block diagram of a network management system according to an embodiment of the present invention. The network management system 600 in FIG. 6 may be OAM device and includes a configuring unit 601 and a sending unit 602.

The configuring unit 601 configures control information, where the control information is used to control the transfer of an ANR log. The sending unit 602 sends the control information to control a first radio network controller to pause or continue transfer of the log to a second radio network controller.

The first radio network controller is a radio network controller that receives the ANR log from a user equipment; and the second radio network controller is a radio network controller that controls a cell where an unconfigured neighbouring cell is detected.

According to the embodiments of the present invention, the control information is configured, and the first radio network controller is controlled to pause or continue transfer of the ANR log to the second radio network controller, thereby implementing the control of ANR log transfer and increasing the utilization efficiency of system resources.

The network management system 600 can execute the processes related to the network management system OAM device in FIG. 1 to FIG. 5 and details thereof will not be described again. For example, the configuring unit 601 may configure the control information by using a network management interface command message or by modifying a configuration attribute of a network management resource model.

The sending unit 602 may send the control information to a Receiving RNC (the first radio network controller), so that the Receiving RNC pauses or continues transfer of the ANR log to a base RNC (the second radio network controller) according to the control information.

Alternatively, the sending unit 602 may send the control information to the base RNC, so that the base RNC instructs, based on the control information, the Receiving RNC to pause or continue transfer of the ANR log.

The control information may include identity information of cells (all or a part of cells) within a control scope of the base RNC, or include identity information of cells (all or a part of cells) within a control scope of the base RNC and identity information of the base RNC.

Figure 7:
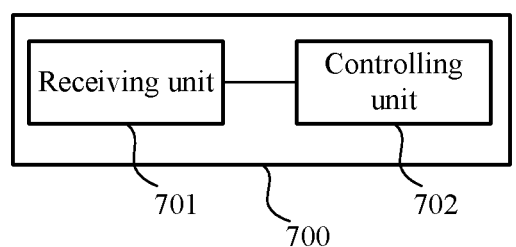
FIG. 7 is a schematic block diagram of a radio network controller according to an embodiment of the present invention.

FIG. 7 is a schematic block diagram of a radio network controller according to an embodiment of the present invention. The radio network controller 700 in FIG. 7 is a radio network controller that receives an automatic neighbour relation ANR log from a user equipment (which, for example, may be referred to as a Receiving RNC) and includes a receiving unit 701 and a controlling unit 702.

The receiving unit 701 receives control information configured by a network management system or receives an instruction generated by a second radio network controller according to the control information, where the control information is used to control transfer of a log. The controlling unit 702 pauses or continues transfer of the log to the second radio network controller according to the control information or the instruction.

The second radio network controller is a radio network controller (which, for example, is referred to as a base RNC) that controls a cell where an unconfigured neighbouring cell is detected.

According to the embodiment of the present invention, the control information is configured, and the pause or continuing of ANR log transfer to the second radio network controller is controlled, thereby implementing the control of ANR log transfer and increasing the utilization efficiency of system resources.

The radio network controller 700 can execute the processes related to the Receiving RNC in FIG. 1 to FIG. 5 and details thereof will not be described again. For example, the control information may include identity information of cells (all or a part of cells) within a control scope of the base RNC and identity information of the base RNC or include only identity information of a cell within a control scope of the base RNC.

The controlling unit 702 may pause or continue transfer of the ANR log through an Iur interface or a network management system.

Figure 8:
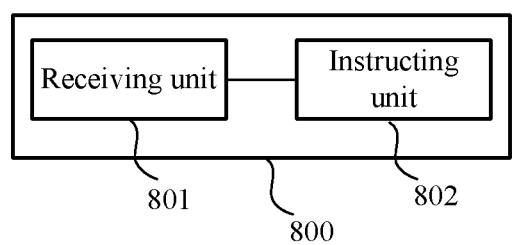
FIG. 8 is a schematic block diagram of a radio network controller according to another embodiment of the present invention.

FIG. 8 is a schematic block diagram of a radio network controller according to another embodiment of the present invention. The radio network controller 800 in FIG. 8 is a radio network controller (which, for example, may be referred to as a base RNC) that controls a cell where an unconfigured neighbouring cell is detected, and includes a receiving unit 801 and an instructing unit 802.

The receiving unit 801 receives control information configured by a network management system, where the control information is used to control transfer of an ANR log. The instructing unit 802 instructs, according to the control information, a first radio network controller to pause or continue transfer of the ANR log to the radio network controller 800.

According to the embodiment of the present invention, the control information is configured, and the first radio network controller is controlled to pause or continue transfer of the ANR log, thereby implementing the control of ANR log transfer and increasing the utilization efficiency of system resources.

The radio network controller 800 can execute the processes related to the base RNC in FIG. 1 to FIG. 5 and details thereof will not be described again. For example, the instructing unit 802 may instruct the Receiving RNC to pause or continue transfer of the ANR log through an Iur interface or a network management system interface.

The control information may include identity information of cells (all or a part of cells) within a control scope of the base RNC, or include identity information of cells (all or a part of cells) within a control scope of the base RNC and identity information of the base RNC.

A person of ordinary skill in the art may appreciate that, in combination with the examples described in the embodiments disclosed in this specification, units and algorithm steps can be implemented by electronic hardware, computer software, or a combination thereof. In order to clearly describe the interchangeability between the hardware and the software, the foregoing has generally described compositions and steps of every embodiment according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to the corresponding process in the foregoing method embodiments, and the details will not be described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit are implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in the embodiments of the present invention. The foregoing storage medium includes: any medium that can store a program code, such as a USB flash disk, a removable hard disk, a read-only memory (Read-Only Memory, ROM), a random access memory (Random Access Memory, RAM), a magnetic disk, or an optical disk.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for log transfer, comprising:
   configuring control information to control transfer of an automatic neighbour relation ANR log; and
   sending the control information to control a first radio network controller to pause or continue transfer of the ANR log to a second radio network controller, wherein the first radio network controller is a radio network controller that receives the ANR log from a user equipment; and the second radio network controller is a radio network controller that controls a cell where an unconfigured neighbouring cell is detected.

2. The method according to claim 1, wherein the sending the control information to control a first radio network controller to pause or continue transfer of the ANR log to a second radio network controller comprises:
sending the control information to the first radio network controller, so that the first radio network controller pauses or continues, according to the control information, transfer of the ANR log to the second radio network controller.

3. The method according to claim 1, wherein the sending the control information to control a first radio network controller to pause or continue transfer of the ANR log to a second radio network controller comprises:
sending the control information to the second radio network controller, so that the second radio network controller instructs, based on the control information, the first radio network controller to pause or continue transfer of the ANR log.

4. The method according to claim 1, wherein the configuring control information comprises:
configuring the control information by using a network management interface command message or by modifying a configuration attribute of a network management resource model.

5. The method according to claim 1, wherein the control information comprises identity information of a cell within a control scope of the second radio network controller, or comprises identity information of a cell within a control scope of the second radio network controller and identity information of the second radio network controller.

6. The method according to claim 5, wherein the identity information of the cell within a control scope of the second radio network controller denotes all or a part of cells controlled by the second radio network controller.

7. A method for log transfer, comprising:
receiving, by a first radio network controller, control information configured by a network management system or receiving an instruction generated by a second radio network controller according to the control information, wherein the control information is used to control transfer of an automatic neighbour relation ANR log; and
pausing or continuing, by the first radio network controller, according to the control information or the instruction, transfer of the ANR log to the second radio network controller, wherein:
the first radio network controller is a radio network controller that receives the ANR log from a user equipment; and the second radio network controller is a radio network controller that controls a cell where an unconfigured neighbouring cell is detected.

8. The method according to claim 7, wherein the control information comprises identity information of a cell within a control scope of the second radio network controller, or comprises identity information of a cell within a control scope of the second radio network controller and identity information of the second radio network controller.

9. A method for log transfer, comprising:
receiving, by a second radio network controller, control information configured by a network management system, wherein the control information is used to control transfer of an automatic neighbour relation ANR log; and
instructing, by the second radio network controller, according to the control information, a first radio network controller to pause or continue transfer of the ANR log to the second radio network controller, wherein:
the first radio network controller is a radio network controller that receives the ANR log from a user equipment; and the second radio network controller is a radio network controller that controls a cell where an unconfigured neighbouring cell is detected.

10. The method according to claim 9, wherein the control information comprises identity information of a cell within a control scope of the second radio network controller, or comprises identity information of a cell within a control scope of the second radio network controller and identity information of the second radio network controller.

11. A network management system, comprising:
a configuring unit that configures control information to control transfer of an automatic neighbour relation ANR log; and
a sending unit that sends the control information to control a first radio network controller to pause or continue transfer of the ANR log to a second radio network controller, wherein:
the first radio network controller is a radio network controller that receives the ANR log from a user equipment; and the second radio network controller is a radio network controller that controls a cell where an unconfigured neighbouring cell is detected.

12. The network management system according to claim 11, wherein the sending unit sends the control information to the first radio network controller, so that the first radio network controller pauses or continues, according to the control information, transfer of the ANR log to the second radio network controller.

13. The network management system according to claim 11, wherein the sending unit sends the control information to the second radio network controller, so that the second radio network controller instructs, based on the control information, the first radio network controller to pause or continue transfer of the ANR log.

14. The network management system according to claim 11, wherein the configuring unit configures the control information by using a network management interface command message or by modifying a configuration attribute of a network management resource model.

15. The network management system according to claim 11, wherein the control information comprises identity information of a cell within a control scope of the second radio network controller, or comprises identity information of a cell within a control scope of the second radio network controller and identity information of the second radio network controller.

16. A radio network controller that receives an automatic neighbour relation ANR log from a user equipment, comprising:
a receiving unit that receives control information configured by a network management system or receives an instruction generated by a second radio network controller according to the control information, wherein the control information is used to control transfer of the automatic neighbour relation ANR log; and a controlling unit that pauses or continues according to the control information or the instruction, transfer of the ANR log to the second radio network controller, wherein:

the second radio network controller is a radio network controller that controls a cell where an unconfigured neighbouring cell is detected.

17. The radio network controller according to claim 16, wherein the control information comprises identity information of a cell within a control scope of the second radio network controller, or comprises identity information of a cell within a control scope of the second radio network controller and identity information of the second radio network controller.

18. A radio network controller that controls a cell where an unconfigured neighbouring cell is detected, comprising:

a receiving unit that receives control information configured by a network management system, wherein the control information is used to control transfer of an automatic neighbour relation ANR log; and an instructing unit that instructs according to the control information, a first radio network controller to pause or continue transfer of the ANR log to the radio network controller, wherein:

the first radio network controller is a radio network controller that receives the ANR log from a user equipment.

19. The radio network controller according to claim 18, wherein the control information comprises identity information of a cell within a control scope of the radio network controller, or comprises identity information of a cell within a control scope of the radio network controller and identity information of the radio network controller.

\* \* \* \* \*